Oct. 25, 1966  T. H. OSTER  3,281,815
LIQUID LEVEL SENSING SYSTEM
Filed July 29, 1963 2 Sheets-Sheet 1
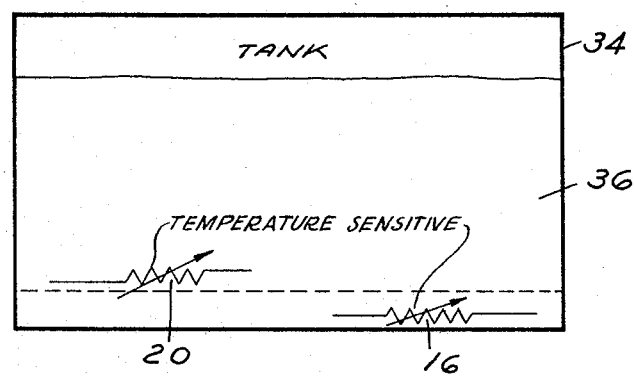
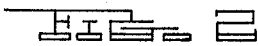
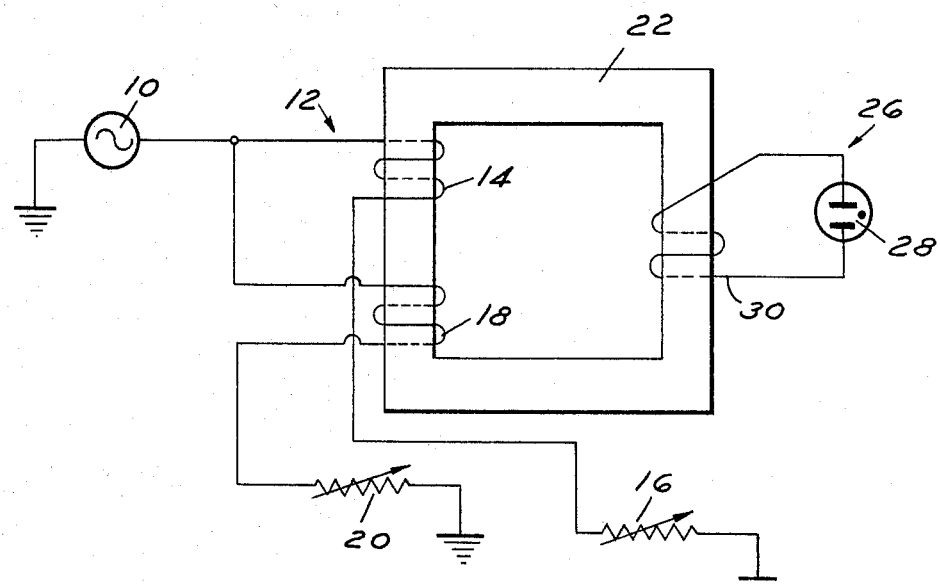
THOMAS H. OSTER
INVENTOR.
BY John R. Faulkner
Stuart Lubitz
ATTORNEYS Oct. 25, 1966   T. H. OSTER   3,281,815
LIQUID LEVEL SENSING SYSTEM
Filed July 29, 1963   2 Sheets-Sheet 2
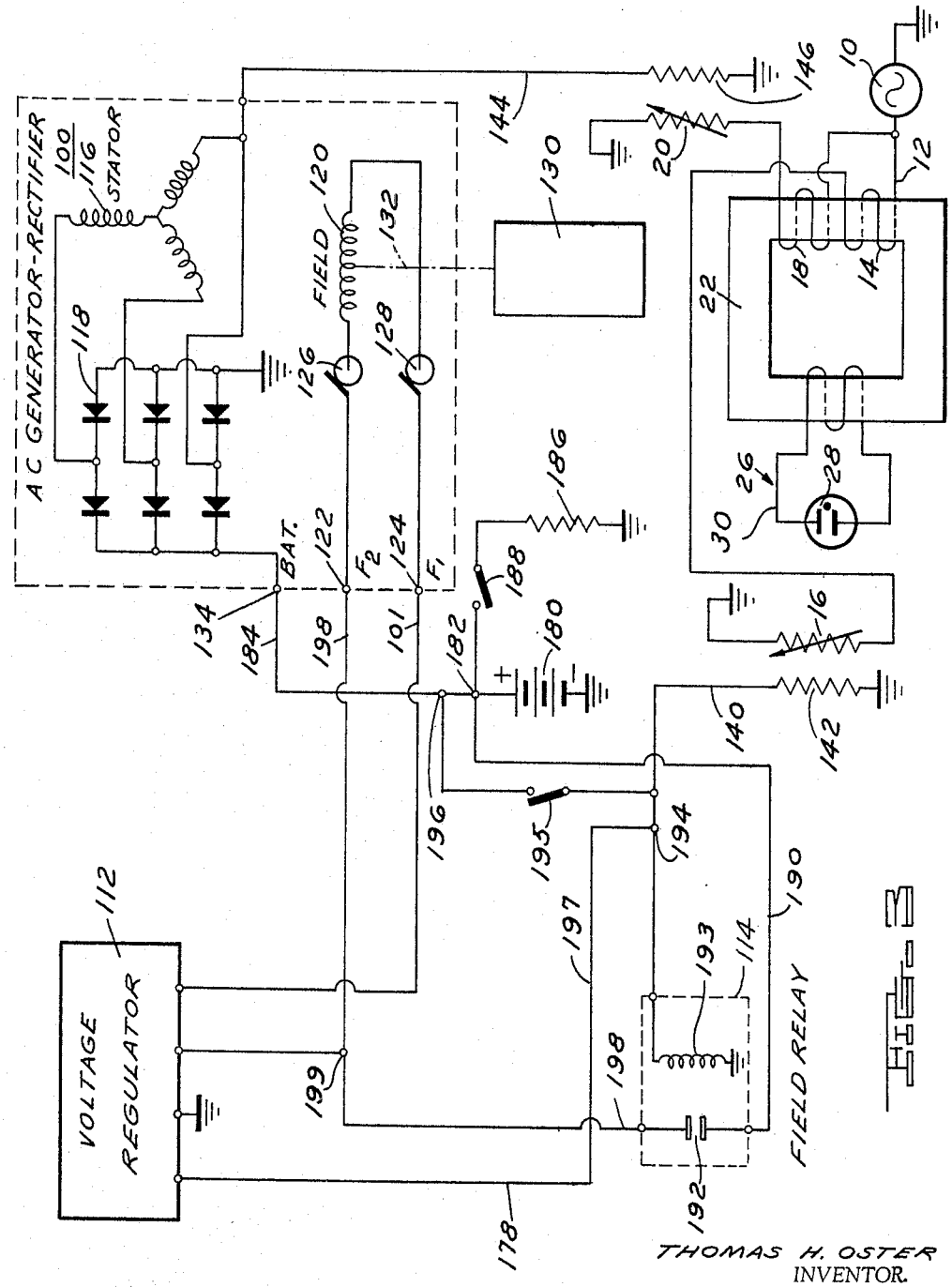
THOMAS H. OSTER
INVENTOR.
BY John R. Faulkner
Stuart Lubitz
ATTORNEYS

United States Patent Office 3,281,815
Patented Oct. 25, 1966

3,281,815
LIQUID LEVEL SENSING SYSTEM
Thomas H. Oster, Dearborn, Mich., assignor to The Ford Motor Company, Dearborn, Mich., a corporation of Delaware
Filed July 29, 1963, Ser. No. 298,157
2 Claims. (Cl. 340—244)

This invention relates to a sensing system and more particularly to a liquid level sensing system.

The sensing system that is the subject of this invention comprises a bridge circuit which includes a pair of inductive coils wound in opposition around a saturable reactor or magnetic core. In addition to the coils, the bridge circuit has a pair of resistance elements, one being a sensing resistor and the other being a reference or standard condition resistor. The magnetic core also has a sensing coil coupled to it that is connected to a glow lamp or neon bulb. In operation the sensing of a given condition by the sensing resistor will alter its resistance and cause an uncanceled magnetic flux to exist in the core. This uncanceled flux induces a voltage in the sensing coil that energizes the neon bulb. This energization and accompanying illumination will indicate that the sensing resistor has sensed a given condition.

The above general description of the invented sensing system evidences that the invention is made from standard elements that are reasonably priced and readily available. Then sensing system has no moving parts. In addition the use of a glow lamp that is not energized until a substantial voltage is induced, usually over 40 volts, permits the assembly to be constructed from elements having rather broad tolerances. This further minimizes the cost of the system.

The general object of this invention is to provide a system having the above features and advantages.

Another object of this invention is to provide a sensing system that can be constructed from elements having broad tolerances.

Another object of this invention is to provide a sensing system that has no moving parts.

Another object of this invention is to provide a sensing system that utilizes a glow lamp.

Another object of this invention is to provide a liquid level sensing system that is readily adaptable to use in an automotive vehicle.

Other objects and advantages will become obvious as the detailed description is read in conjunction with the drawings wherein:

FIGURE 1 is a schematic representation of a tank having the resistors of the bridge circuit located therein;

FIGURE 2 is an electrical schematic diagram of the sensing system; and

FIGURE 3 is an alternate embodiment of the invented system applied to the electrical generating system of an automotive vehicle.

Referring to FIGURES 1 and 2, the sensing system includes an electrical generator that is preferably an alternating current source such as the alternator of an automotive vehicle or the instrument supply for such a vehicle. The alternator 10 is connected to a bridge circuit 12 that comprises a magnetizing means or coil 14 connected in circuit to the alternator 10 and connected in circuit to an impedance or resistor means 16 which is in turn connected to ground. The coil 14 and resistor 16 may be considered to be a first leg or branch of the bridge circuit. The resistor 16 is sensitive to temperature and has a positive temperature coefficient of resistance. It may, however, have a negative temperature coefficient of resistance such as a thermistor or it may be sensitive to pressure or other conditions.

A second branch or leg of the bridge circuit includes a second magnetizing means or coil 18 and a second impedance means or resistor 20. The coil 18 is electrically connected to the alternator 10 and also connected to the resistor 20 which is connected to ground.

The coils 14 and 18 are wound about or coupled to a saturable reactor or magnetizable core 22. This core 22 may be made of any of the well-known magnetizable materials such as a ferrite composition. The coils 14 and 18 are coupled to the magnetizable core 22 so that the flux created by one coil is in opposition to the flux created by the other coil.

A lamp means 26 is coupled to the saturable reactor for sensing when the flux generated by one of the coils 14 or 18 is substantially greater than the flux generated by the other opposing coil 14 or 18. This lamp means comprises a glow lamp 28 such as the common neon or argon lamps. These lamps are usually constructed to illuminate at voltages above 40 volts. The neon lamp 28 is coupled to the magnetizable core 22 by a sensing winding 30. The winding 30 is coupled to or wrapped around the magnetizable core 22 and has its ends connected to the neon bulb 28.

In operation an alternating electrical voltage is applied to the circuit branch comprising coil 14 and resistor 16 and an equal voltage is applied to the circuit branch comprising coil 18 and resistor 20. If the impedance of these circuit branches are substantially equal, the current through one circuit branch will substantially equal the current through the other circuit branch. When the currents through the coils 14 and 18 are equal, the magnetic flux caused by these currents will also be equal and in opposition to one another, thereby minimizing the flux in the core. This results in the sensing coil 30 having little or no flux linkage passing through it and consequently the neon lamp 28 remains de-energized. If the resistance of one of the resistors 16 or 20 changes, the current in its associated coil 14 or 18 will also change. This results in an uncanceled flux existing in the magnetizable core 22. The uncanceled flux will pass through the sensing coil 30 and will thereby induce a voltage in the sensing coil 30. When this voltage reaches a substantial value, such as a value greater than 40 volts, the neon lamp 28 will be illuminated.

The neon lamp 28 will only be illuminated when one of the resistors 16 or 20 senses a definite condition and experiences a substantial change in resistance. Such a condition might very well be the uncovering of the resistor 20 when normally submerged in a tank 34 by a liquid 36 such as gasoline. As shown in FIGURE 1, the resistors 16 and 20 are normally submerged by the gasoline 26 in the fuel tank of an automotive vehicle. When the fuel level falls to a point such as indicated by the broken lines, it will be exposed to the air and it will heat up and consequently experience a change in resistance. This change in resistance will be sufficient to cause a flux unbalance that will induce a relatively large voltage in the sensing coil 30. This large voltage in the sensing coil will energize the neon lamp 28 and thereby indicate that a selected fuel level has been reached. The continued consumption of gasoline will cause its level to drop and uncover the resistor 16. When the resistor 16 is uncovered, the flux in the magnetizable core 22 will again become substantially balanced and the neon lamp 28 extinguished. This will indicate that another fuel level has been reached.

It should be noted that the values of the coil 14 and the resistor 16 can be so selected that the bridge approaches a balanced condition with all elements removed from the tank 34 with the exception of the resistor 20. This will give rise to an indication only when the resistor 20 is uncovered. The indication will remain effective so long as the resistor 20 remains uncovered. Further, the proper selection of the turns ratio of the coils 14 and 18 and the sensing coil 30 will permit various amounts of uncanceled flux to be sensed.

It should be understood that when the sensing system is constructed, it is not necessary that the impedance of the circuit branch comprising the coil 14 and the resistor 16 be exactly equal to the impedance of the circuit branch comprising coil 18 and resistor 20. The existence of a relatively small flux in the core 22 will not energize the lamp 28. This permits the use of elements having rather broad tolerances and being relatively inexpensive without affecting the operation of the system.

An alternate embodiment of the invention is shown in FIGURE 3. In this embodiment of the invention, the sensing system is associated with a typical motor vehicle electrical system such as the one described in U.S. Patent 3,022,456, issued on February 20, 1962, to R. L. Larson et al. The details and operation of a motor vehicle electrical system are well known in the art and described in the patent to Larson et al. In this use the sensing system is adapted to sense when the voltage or output of the alternator 100 is below that of the battery 180. When this condition is sensed, the neon lamp 28 will be energized. To this end a conductor 140 connects the heater means or resistor 142 to the conductor 194. The conductor 194 is connected to the battery 180 via the switch 195 and conductor 196. The heater 142 is located adjacent the first sensing resistor 16 and is connected to ground.

A conductor 144 is connected to the output of the alternator 100 and is also connected to a heater or resistor means 146 which is in turn connected to ground. The heater means 146 is located adjacent the second sensing resistor 20. The components of the sensing system 10-30 are substantially identical with those shown in FIGURE 2 and described above.

In operation when the alternator is generating its usual 12-14 volts and the battery is supplying an 11 to 12 volt potential between ground and conductor 194, the temperature of the heater means 142 and 146 will be substantially the same. When the alternator is not functioning properly and its output falls substantially below that of the battery, the temperature of the resistor 146 will decrease. This temperature decrease of the resistor 146 will cause a temperature differential to exist between the resistors 142 and 146 and consequently the resistance of the resistor 16 will be substantially larger than that of the resistor 20. This will result in a substantial uncanceled flux passing through the sensing coil 30. This uncanceled flux will induce a voltage in the sensing coil 30 and energize the neon lamp 28 indicating that the alternator is not functioning properly. The system will also indicate when the alternator output is excessively high or when the battery output is excessively low relative to the alternator output. An extreme variation of the electrical generating system from its normal operation will cause the neon lamp 28 to be illuminated.

It will be understood that the invention is not to be limited to the exact construction shown and described but that various changes and modifications may be made without departing from the spirit and scope of the invention, as defined in the claims. Such changes as making the resistors 16 and 20 integral with or an extension of the coils 14 and 18 and other similar changes are clearly within the scope of the appended claims.

I claim:
1. In a system for sensing the relative output level of the battery and dynamoelectric machine of an automotive vehicle electrical generating system, the combination comprising an alternating voltage supply, a saturable reactor, a first magnetizing coil coupled to induce a magnetic flux in said reactor and in circuit with said voltage supply, a second magnetizing coil coupled to said reactor to induce a magnetic flux in said reactor in opposition to the magnetic flux induced by said first magnetizing coil, said second magnetizing coil in circuit with said voltage supply, a first resistor in circuit with said first magnetizing coil and a second resistor in circuit with said second magnetizing coil, a first heater means for generating heat in accordance with the output of the battery of the electrical generating system, said first heater means located in the proximity of said first resistor, a second heater means for generating heat in accordance with the output of the dynamoelectric machine of the electrical generating system, said second heater means located in the proximity of said second resistor and a glow lamp means coupled to said reactor for conducting only when the heat generated by one of said heater means substantially exceeds the heat generated by the other heater means.

2. In a fluid level sensing system, the combination comprising a fluid reservoir, an alternator, a magnetizable core, a first magnetizing coil coupled to induce a magnetic flux in said core and in series circuit with said alternator, a second magnetizing coil coupled to said core to induce a magnetic flux in said core in opposition to the magnetic flux induced by said first magnetizing coil, said second magnetizing coil in series circuit with said electrical generator, a first resistor means in series circuit with said first magnetizing coil and a second resistor means in series circuit with said second magnetizing coil, said resistors located in said fluid reservoir at two different levels to sense the level of the fluid in said reservoir and a glow lamp means coupled to said core by a sensing coil for conducting only when a substantial uncanceled flux is induced in said reactor by the fluid level attaining a given condition, said substantial uncanceled flux causing a voltage and corresponding current of a predetermined magnitude sufficient to be conducted by said glow lamp means to be induced in said sensing coil.

References Cited by the Examiner
UNITED STATES PATENTS

| | | | |
|---|---|---|---|
| 2,118,483 | 5/1938 | Woodman | 315—130 X |
| 2,966,614 | 12/1960 | Favre | 340—248 X |
| 3,072,858 | 1/1963 | Siskind | 340—253 X |
| 3,143,729 | 8/1964 | Power | 340—251 X |
| 3,145,567 | 8/1964 | Bobrowsky | 73—295 |
| 3,215,926 | 11/1965 | Boddy | 317—132 X |

NEIL C. READ, *Primary Examiner.*

D. K. MYER, *Examiner.*